US010644786B1

(12) United States Patent
McCormick et al.

(10) Patent No.: US 10,644,786 B1
(45) Date of Patent: May 5, 2020

(54) PLUG-AND-PLAY VEHICLE COMMUNICATION SYSTEM AND METHOD

(71) Applicant: Cabin Management Solutions, LLC., Conroe, TX (US)

(72) Inventors: Jeffrey M. McCormick, The Woodlands, TX (US); John Michael Jeffers, Tomball, TX (US)

(73) Assignee: CABIN MANAGEMENT SOLUTIONS, LLC., Conroe, TX (US)

( * ) Notice: Subject to any disclaimer, the term of this patent is extended or adjusted under 35 U.S.C. 154(b) by 0 days.

(21) Appl. No.: 16/711,509

(22) Filed: Dec. 12, 2019

(51) Int. Cl.

| | |
|---|---|
| ***H04W 84/06*** | (2009.01) |
| ***H04B 7/185*** | (2006.01) |
| ***H04W 84/00*** | (2009.01) |
| ***G08G 5/00*** | (2006.01) |
| ***H04L 29/08*** | (2006.01) |

(52) U.S. Cl.
CPC ....... *H04B 7/18506* (2013.01); *G08G 5/0021* (2013.01); *H04L 67/12* (2013.01); *H04W 84/005* (2013.01); *H04W 84/06* (2013.01)

(58) Field of Classification Search
CPC ... G08G 5/0021; H04L 67/12; H04W 84/005; H04W 84/06
See application file for complete search history.

(56) References Cited

U.S. PATENT DOCUMENTS

| | | | |
|---|---|---|---|
| 8,326,230 | B2 | 12/2012 | Schirmacher |
| 8,862,680 | B2 | 10/2014 | Gould et al. |
| 8,933,819 | B1 | 1/2015 | Garrettson |
| 10,162,514 | B2 | 12/2018 | Shapiro |
| 10,313,982 | B1 | 6/2019 | Rabii |
| 2006/0075934 | A1 | 4/2006 | Ram |
| 2006/0240389 | A1 | 10/2006 | Testrake |
| 2007/0057576 | A1 | 3/2007 | Lee |
| 2008/0078870 | A1 | 4/2008 | Kneller |
| 2012/0240220 | A1 | 9/2012 | Smith |
| 2012/0319869 | A1 | 12/2012 | Dormann |
| 2014/0079242 | A1 | 3/2014 | Nguyen |
| 2015/0360796 | A1 | 12/2015 | Huet |
| 2016/0104358 | A1 | 4/2016 | Meier |

(Continued)

OTHER PUBLICATIONS

Notice of Allowance dated Feb. 4, 2020, U.S. Appl. No. 16/711,493, 15 pages.

*Primary Examiner* — Sam Bhattacharya
(74) *Attorney, Agent, or Firm* — MH2 Technology Law Group LLP

(57) ABSTRACT

A system for communicating within a vehicle includes a cabin manager unit (CMU) in the vehicle. The CMU is configured to communicate with a device in the vehicle and configured to communicate wirelessly with a first panel in the vehicle. The CMU is configured to perform operations. The operations include electronically removing the first panel from the network in response to the first panel malfunctioning. The operations also include electronically adding a second panel to the network to replace the first panel. The CMU is configured to communicate wirelessly with the second panel. The operations also include ranking a plurality of frequency ranges used by the second panel based at least partially upon one or more metrics of the frequency ranges. The operations also include assigning a first command signal to one of the frequency ranges based at least partially upon the ranking.

18 Claims, 6 Drawing Sheets

100 169 153 163 124 122 151 161 120 120 152 118 164 165 140 116 110 112 114 162 166

(56) References Cited

U.S. PATENT DOCUMENTS

2016/0119914 A1 4/2016 Oizumi
2016/0221816 A1 8/2016 Pollock
2016/0257415 A1 9/2016 Ye
2016/0277161 A1 9/2016 Haque
2016/0344792 A1 11/2016 Sinivaara
2016/0352413 A1 12/2016 Tani
2017/0064067 A1 3/2017 Hockenberry
2017/0073081 A1 3/2017 Regan
2017/0088272 A1 3/2017 Meis
2017/0230916 A1 8/2017 Stein
2017/0247112 A1 8/2017 Horner
2017/0265140 A1* 9/2017 Dodonov .......... H04W 52/0274
2018/0108188 A1 4/2018 Canning
2018/0124795 A1 5/2018 Rajendran
2018/0234706 A1 8/2018 Boussemart
2018/0249228 A1* 8/2018 Yoshikawa ......... H04L 61/2038
2018/0257663 A1 9/2018 Jiang
2018/0257783 A1 9/2018 Simms
2018/0257784 A1 9/2018 Simms
2019/0039734 A1 2/2019 Shah
2019/0256227 A1 8/2019 Balasubramanian
2019/0355178 A1* 11/2019 Hermina Martinez ...................... G06K 9/00838
2019/0361575 A1* 11/2019 Ni ......................... H04L 12/282
2019/0373313 A1 12/2019 Jackson
2019/0384356 A1 12/2019 Balasubramanian

* cited by examiner

PLUG-AND-PLAY VEHICLE COMMUNICATION SYSTEM AND METHOD

BACKGROUND

Existing communication systems in a vehicle (e.g., an airplane) oftentimes include a cabin manager unit (CMU) and a plurality of panels. The CMU and the panels are connected via wires. The panels may be located throughout the aircraft. Each user (e.g., passenger) may have a panel proximate to his/her seat. As an example, a user may enter a command into his/her panel to turn on a reading light. The command is transmitted from the panel to the CMU via a first wire, and then the CMU transmits the command to the reading light via a second wire.

However, over time, these systems encounter problems that require one or more portions of the system to be repaired or replaced. This may include removing portions of the vehicle to access the system. For example, the floor, wall, ceiling, etc. of the vehicle may be removed to access the portions of the system to be repaired or replaced. Not only is this a time-consuming and expensive process, but, oftentimes, the floor, wall, ceiling, etc. of the vehicle that is temporarily removed is damaged (e.g., scratched) while being moved or stored.

SUMMARY

A system for communicating within a vehicle is disclosed. The system includes a cabin manager unit (CMU) in the vehicle. The CMU is configured to communicate with a device in the vehicle and configured to communicate wirelessly with a first panel in the vehicle via a network of a communication system in the vehicle. The CMU is configured to perform operations. The operations include electronically removing the first panel from the network in response to the first panel malfunctioning. The operations also include electronically adding a second panel to the network to replace the first panel. The CMU is configured to communicate wirelessly with the second panel. The operations also include ranking a plurality of frequency ranges used by the second panel based at least partially upon one or more metrics of the frequency ranges. The operations also include assigning a first command signal to one of the frequency ranges based at least partially upon the ranking. The first command signal includes a command from a user received at the second panel. The operations also include receiving the first command signal from the second panel in the assigned frequency range. The operations also include transmitting a second command signal to the device. The second command signal includes the command from the user, and the device actuates from a first state to a second state in response to the second command signal.

A system for communicating within an airplane is also disclosed. The system includes a first panel, a second panel, a third panel, and a cabin manager unit (CMU). The CMU is in the airplane and configured to communicate wirelessly with the first panel, the second panel, the third panel, or a combination thereof in the airplane via a network of a communication system. The CMU is also configured to communicate with a plurality of devices in the airplane through one or more wires. The CMU is configured to perform operations. The operations include transmitting default state signals to the devices. The operations also include transmitting advertising signals to the first panel, the third panel, or both. The operations also include electronically removing the first panel from the network in response to the first panel malfunctioning. The operations also include electronically adding the second panel to the network to replace the first panel. Electronically adding the second panel includes receiving an addition command signal from the third panel. The operations also include electronically configuring the second panel by transmitting a configuration signal to the second panel. The configuration signal informs the second panel of a priority level of a first device of the plurality of devices and a current state of the first device. The operations also include receiving a plurality of metrics from the second panel. The metrics are measured by the second panel. The metrics are related to a plurality of frequency ranges used by the second panel. The metrics include signal strength, bandwidth, and error rate. The operations also include ranking the frequency ranges based at least partially upon the metrics. The frequency ranges are ranked by reliability, speed, or a combination thereof. The operations also include assigning a first command signal to a first frequency range of the plurality of frequency ranges based at least partially upon the ranking, the priority level of the first device, and a size of the first command signal. The first command signal includes a command received from a user at the second panel. The command is to actuate the first device from the default state to a second state. The operations also include receiving the first command signal from the second panel in the first frequency range. The first command signal is wireless. The operations also include transmitting a second command signal to the first device. The second command signal includes the command from the user. The first device actuates from the default state to the second state in response to the second command signal. The second command signal is transmitted through one of the one or more wires.

A method for communicating within a vehicle is also disclosed. The method includes electronically removing a first panel from a network of a communication system in the vehicle in response to the first panel malfunctioning. The method also includes electronically adding a second panel to the network to replace the first panel. The method also includes ranking a plurality of frequency ranges used by the second panel based at least partially upon one or more metrics of the frequency ranges. The method also includes assigning a first command signal to one of the frequency ranges based at least partially upon the ranking. The first command signal includes a command from a user received at the second panel. The method also includes receiving the first command signal from the second panel in the assigned frequency range. The method also includes transmitting a second command signal to a device. The second command signal includes the command from the user. The device actuates from a first state to a second state in response to the second command signal.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
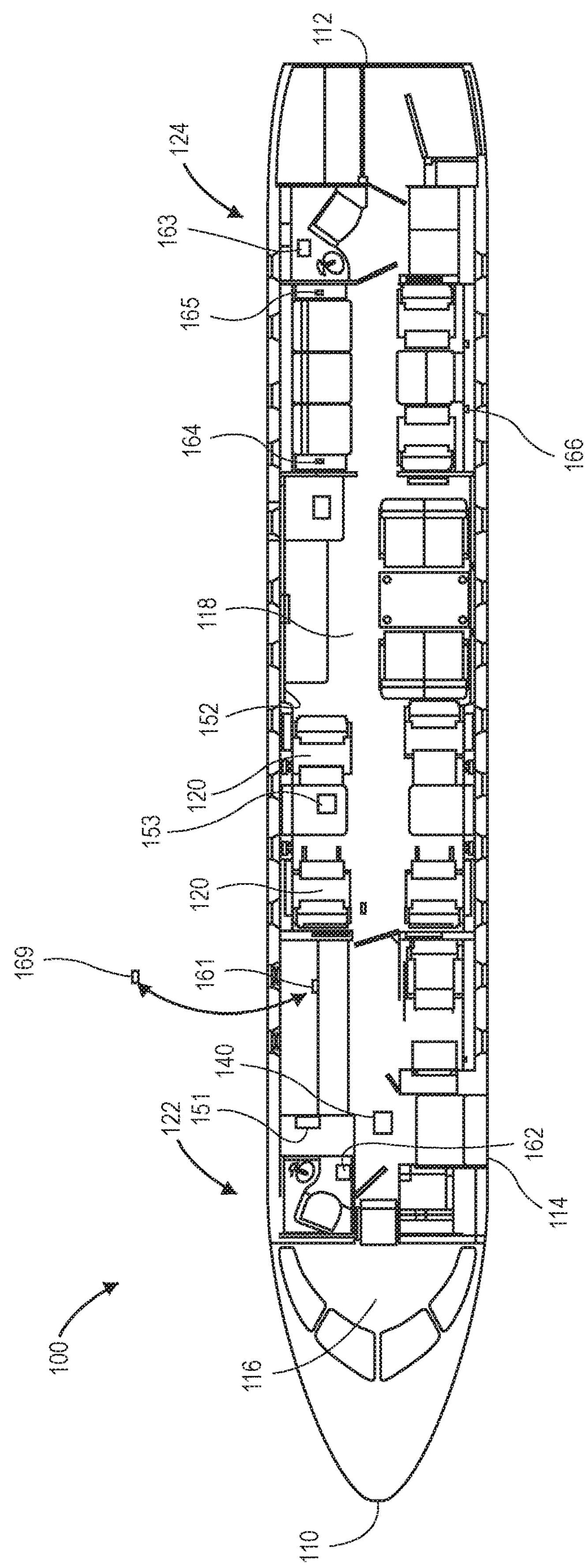
FIG. 1 illustrates a plan view of a portion of a vehicle, according to an embodiment.

FIG. 1 illustrates a plan view of a portion of a vehicle 100, according to an embodiment. In the example shown in FIG. 1, the vehicle 100 is an airplane. However, as will be appreciated, the systems and methods described herein may also or instead apply to other vehicles such as helicopters, spaceships, cars, buses, boats, trains, etc.

The vehicle 100 may include a first (e.g., forward) end 110 and a second (e.g., aft) end 112. The vehicle 100 may also include a door 114 through which passengers may board and de-board. The vehicle 100 may also include a cockpit 116 located proximate to the forward end 110. The vehicle 100 may also include an aisle 118 that extends at least partially between the forward end 110 and the aft end 112. The vehicle 100 may also include a plurality of seats 120 positioned on one or both sides of the aisle 118. The vehicle 100 may also include one or more lavatories (two are shown: 122, 124).

Figure 2:
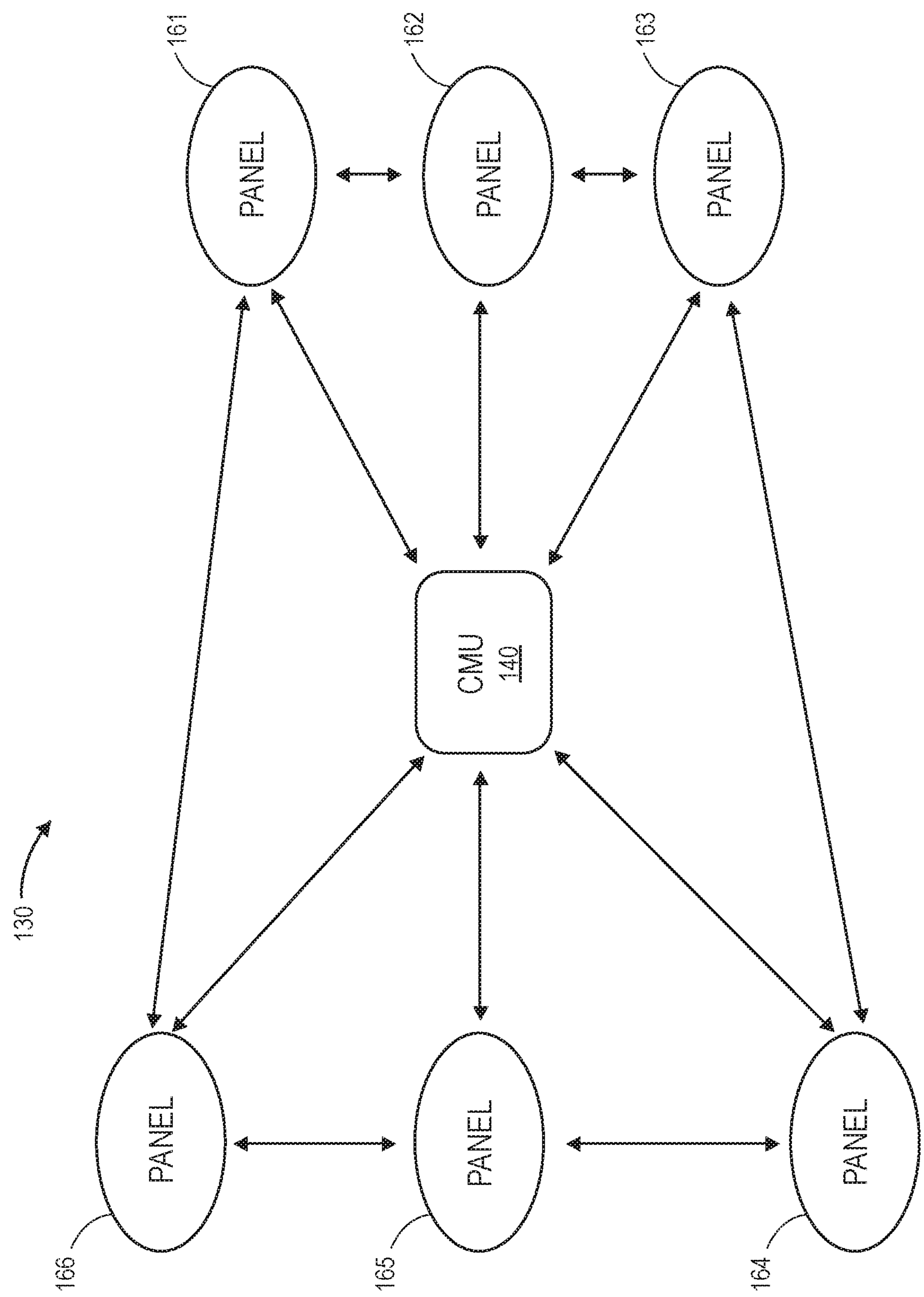
FIG. 2 illustrates a schematic view of a communication system in the vehicle operating as a single-frequency mesh with a single broadcast domain, according to an embodiment.
Figure 3:
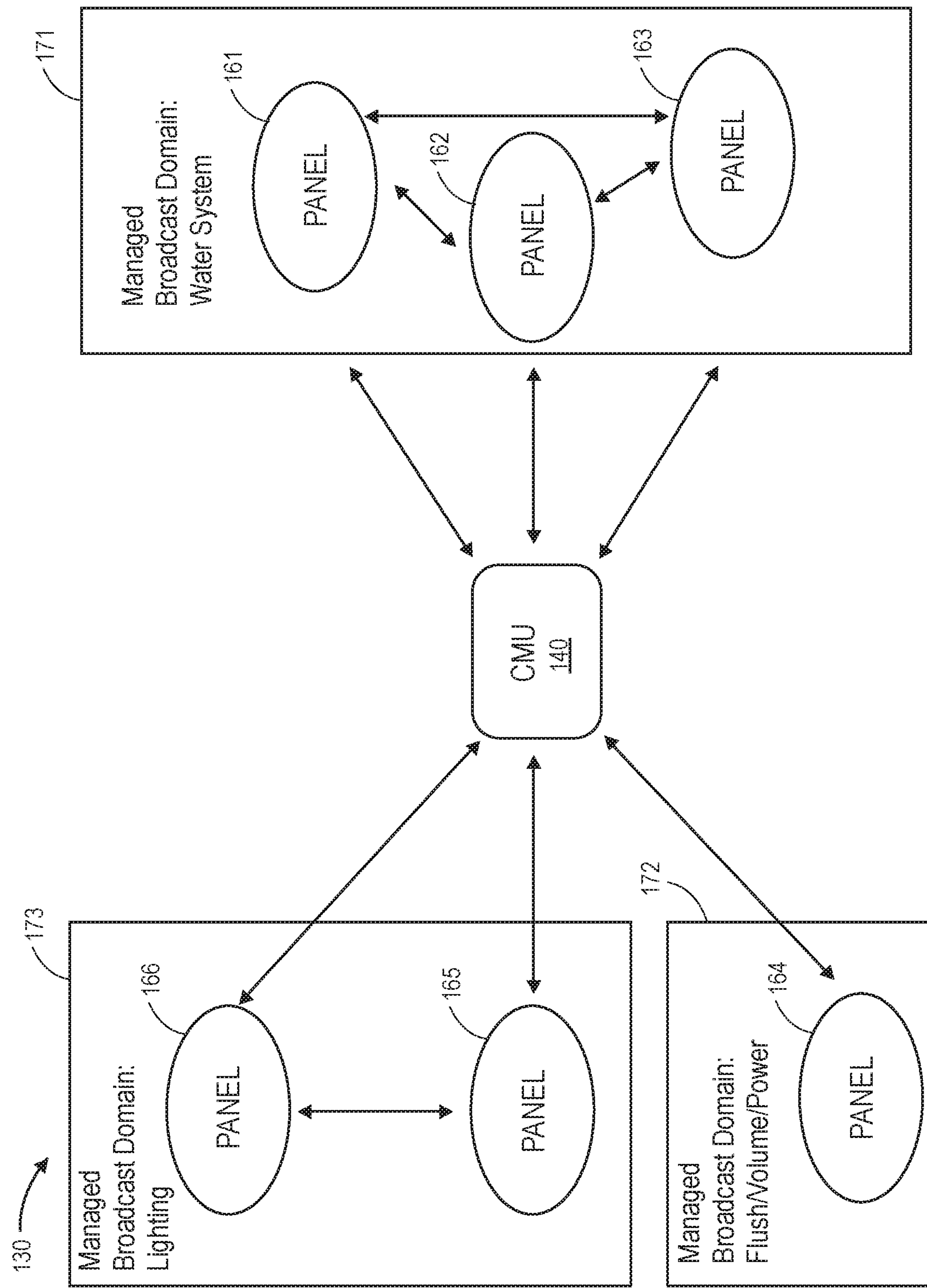
FIG. 3 illustrates a schematic view of the communication system operating as a single-frequency mesh with multiple broadcast domains, according to an embodiment.
Figure 4:
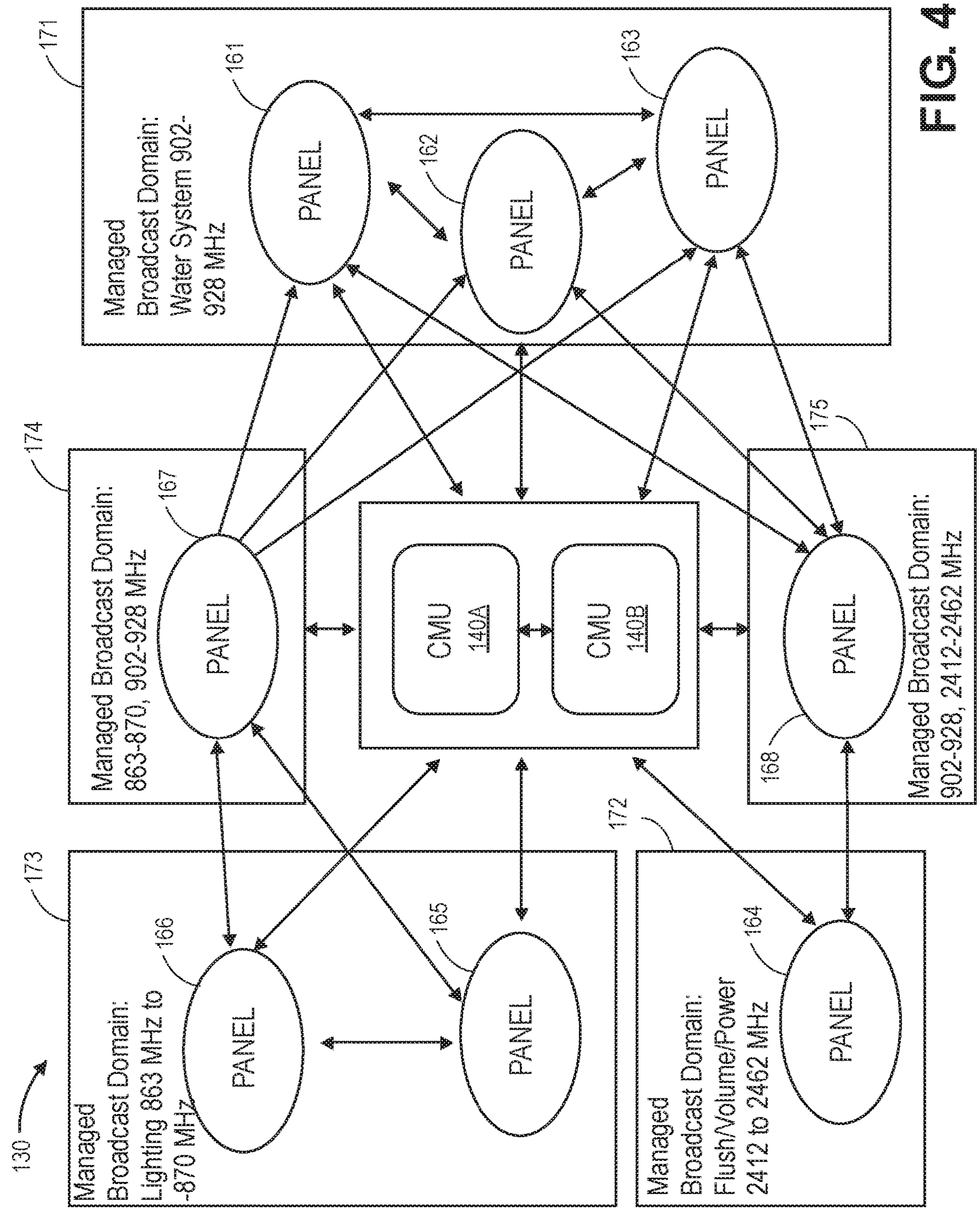
FIG. 4 illustrates another schematic view of the communication system operating as a multi-frequency mesh with multiple broadcast domains, according to an embodiment.

The vehicle 100 may also include a communication system 130, which is shown in FIGS. 2-4. Referring back to FIG. 1, the communication system 130 may include a cabin manager unit (CMU) 140. As described in greater detail below, the CMU 140 may segregate and manage broadcast domains of the communication system 130. The CMU 140 may also determine which frequencies the communication system 130 may use at a given time based at least partially upon the strongest frequencies (e.g., with the greatest bandwidth) and least-encumbered frequencies (e.g., the most reliable frequencies). Thus, the CMU 140 may switch between frequencies (e.g., frequency hop) to spread the spectrum of signals to overcome potential interference and latency.

The communication system 130 may also include a plurality of devices (three are shown: 151-153). The devices 151-153 may be in communication with the CMU 140 wirelessly or via one or more wires. For example, the devices 151-153 may be in communication with the CMU 140 via one or more wires that are installed before the CMU 140 is installed (i.e., existing wires). The CMU 140 may be configured to control the devices 151-153. More particularly, the CMU 140 may be configured to cause the devices 151-153 to actuate into and/or between one or more states (e.g., on or off). For example, the CMU 140 may be configured to cause the devices 151-153 to actuate into a first (e.g., default) state when the vehicle 100 and/or the communication system 130 is turned on.

Several illustrative devices 151-153 are identified in FIG. 1 and described below; however, it will be appreciated that this list is merely illustrative and not exhaustive. The devices 151-153 may be classified into one or more priority levels by an authorized user, and the priority levels may be pre-programmed (e.g., stored) into the CMU 140. For example, the devices 151-153 may be classified into first (e.g., high) priority level devices, second (e.g., intermediate) priority level devices, and third (e.g., low) priority level devices.

The first (e.g., high) priority level devices 151 may rely upon substantially real-time communication. Thus, communication involving or controlling the first (e.g., high) priority level devices 151 may take priority over communication involving or controlling other devices 152, 153. In the example shown in FIG. 1, the first (e.g., high) priority level device 151 is part of a water system, which may perform functions such as turning a water system on/off, pressurizing the lines, heating and line purging, etc. More particularly, the first (e.g., high) priority level device 151 is a wet sensor that is part of the water system. In an example, in response to a measurement from the wet sensor 151 (e.g., indicating a problem with the water system), substantially real-time communication with the CMU 140 may be used to turn the water system on/off. Although not shown, other first (e.g., high) priority level devices may be or include cabin calls to the cockpit annunciator panel, call chime, or other any device that requires an immediate response from a user input.

The communication with the second (e.g., intermediate) priority level devices 152 may have a lesser priority than the first (e.g., high) priority level devices 151; however, the second (intermediate) level priority devices 152 may still take priority over communication with some other devices 153. The second (e.g., intermediate) priority level devices 152 may be or include devices that transmit and/or receive high-volume signals. The second (e.g., intermediate) priority level devices 152 may also or instead be or include devices that transmit and/or receive signals related to diagnostics, logs, statistical analysis, etc. In the example shown in FIG. 1, the second (e.g., intermediate) priority level device 152 is an up-wash and down-wash light. Although not shown, other second (e.g., intermediate) priority level devices may be or include entry lights, main cabin lights, aisle lights, lavatory lights, table/reading lights, flight attendant calls, window shades, entertainment and information displays, thermostats, and the like.

The communication with the third (e.g., low) priority level devices 153 may have a lesser priority than the first (e.g., high) priority level devices 151 and the second (e.g., intermediate) level devices 152. The third (e.g., low) priority level devices 153 may be or include devices that transmit and/or receive signals that involve no user input and/or do not control systems functions. In the example shown in FIG. 1, the third (e.g., low) priority level device 153 is a chiller. As will be appreciated, a delay of a second or two does not directly or substantially affect the user (e.g., passenger) or the chiller.

As will be appreciated, the priority level of the devices 151-153 may be changed in the CMU 140 at any time by the authorized user. In addition, the priority level of the devices 151-153 may differ from vehicle to vehicle. For example, although the vehicle (e.g., aircraft) described above may have the chiller classified as a third (e.g., low) priority level device, another aircraft may classify the chiller as a second (e.g., intermediate) priority level device.

The communication system 130 may also include a plurality of panels (six are shown: 161-166). The panels 161-166 may be or include buttons, knobs, switches, touchscreens, or the like that are configured to receive user input (e.g., commands) to control one or more of the devices 151-153. The panels 161-166 may be in communication with the CMU 140 and/or the devices 151-153 wirelessly or via one or more wires. In one embodiment, the panels 161-166 may be configured to control one or more of the devices 151-153 directly (e.g., without transmitting signals to the CMU 140). In another embodiment, the panels 161-166 may be configured to control one or more of the devices 151-153 indirectly. More particularly, the panels 161-166 may transmit wireless signals to the CMU 140, and the CMU 140 may then transmit signals to the one or more devices 151-153 to control the one or more devices 151-153. The signals from the CMU 140 to the devices 151-153 may be wireless or via one or more (e.g., existing) wires.

Several panels 161-166 are identified in FIG. 1 and described below; however, it will be appreciated that this list is merely illustrative and not exhaustive. In an example, a first panel 161 may be or include a galley control panel (also referred to as a master switch) that is configured to control one or more of the devices (e.g., the wet sensor 151 and the up-wash and down-wash lights 152). A second panel 162 may be or include a forward lavatory panel that is configured to control one or more of the devices (e.g., a lavatory light and a toilet in the forward lavatory 122). A third panel 163 may be or include an aft lavatory panel that is configured to control one or more of the devices (a lavatory light and a toilet in the aft lavatory 124). Additional panels 164-166 may be or include passenger control units (e.g., proximate to the seats 120) that are configured to control one or more of the devices (e.g., the up-wash and down-wash lights 152 and the table/reading lights 153). Although not shown, in one embodiment, each of the seats 120 may have a corresponding panel (e.g., passenger control unit).

FIG. 2 illustrates a schematic view of the communication system 130 operating as a single-frequency mesh with a single broadcast domain, according to an embodiment. The communication system 130 includes the CMU 140 and the panels 161-166. Although not shown in FIG. 2, the communication system 130 may also include the devices 151-153.

As used herein, a "single-frequency mesh" refers to a single frequency range that is used to transmit signals between the CMU 140 and the panels 161-166 (and/or between the different panels 161-166) in the communication system 130. As used herein, a "single broadcast domain" refers to a division of a network of the communication system 130, in which all nodes within that domain (e.g., CMU 140 and/or panels 161-166) can communicate with one another. When the communication system 130 operates as a single-frequency mesh in a single broadcast domain, the CMU 140 may communicate wirelessly and directly with each of the panels 161-166 in a single (e.g., common) frequency range, and each of the panels 161-166 may communicate wirelessly and directly with one another in the single (e.g., common) frequency range.

FIG. 3 illustrates a schematic view of the communication system 130 operating as a single-frequency mesh with multiple broadcast domains 171-173, according to an embodiment. As used herein, "multiple broadcast domains" refer to multiple divisions or segregations of the network of the communication system 130. Having multiple broadcast domains 171-173 may segregate the network to increase traffic efficiency and throughput for quality of service (QOS) reasons, or for security or safety reasons. In the example of FIG. 3, each of the broadcast domains 171-173 operates within a single (e.g., common) frequency range.

As shown, the panels 161-166 may be assigned to and/or operate within one (or more) of the broadcast domains 171-173. In the example shown in FIG. 3, the panels 161-163 are assigned to and/or operate within the first broadcast domain 171, the panel 164 is assigned to and/or operates within the second broadcast domain 172, and the panels 165, 166 are assigned to and/or operate within the third broadcast domain 173. In one embodiment, only components with multi-frequency capability may pass traffic between different broadcast domains 171-173. In this example, the CMU 140 has multi-frequency capability and can communicate with the panels 161-166 in each of the broadcast domains 171-173.

FIG. 4 illustrates a schematic view of the communication system 130 operating as a multi-frequency mesh with multiple broadcast domains, according to an embodiment. As used herein, a "multi-frequency mesh" refers to multiple different frequency ranges that are used to transmit signals between the CMU 140 and panels 161-166 (and/or between the different panels 161-166) in the communication system 130.

The example in FIG. 4 is similar to the example in FIG. 3, except the CMU 140 may include two CMUs 140A, 140B that operate in parallel. In addition, the different broadcast domains may be assigned to or operate within different frequency ranges. As shown, the first broadcast domain 171 transmits signals in a first frequency range (e.g., 902 megahertz (MHz)-928 MHz), the second broadcast domain 172 transmits signals in a second frequency range (e.g., 2412 MHz-2462 MHz), and the third broadcast domain 173 transmits signals in a third frequency range (e.g., 863

MHz-870 MHz). Assigning the broadcast domains to different frequency ranges may further reduce interference and increase traffic efficiency and throughput within the communication system 130.

Also, two additional broadcast domains are shown in FIG. 4: 174, 175. The broadcast domains 174, 175 may be assigned to or operate within one or more of the frequency ranges. As shown, the fourth broadcast domain 174 may be assigned to or operate within the first frequency range (e.g., 902 MHz-928 MHz) and the third frequency range (e.g., 863 MHz-870 MHz). Another panel (e.g., a galley panel) 167 may be assigned to or operate within the fourth broadcast domain 174. The panel 167 may be configured to transmit signals to and receive signals from the CMU(s) 140A, 140B, the panels 161-163 in the first broadcast domain 171, and/or the panels 165, 166 in the third broadcast domain 173, but not the panel 164 in the second broadcast domain 172. The signals transmitted to and received from the panel 167 may be in the first frequency range (e.g., 902 MHz-928 MHz) and the third frequency range (e.g., 863 MHz-870 MHz), but not in the second frequency range (e.g., 2412 MHz-2462 MHz).

As shown, the fifth broadcast domain 175 may be assigned to or operate within the first frequency range and the second frequency range. Another panel (e.g., an aft panel) 168 may be assigned to or operate within the fifth broadcast domain 175. The panel 168 may be configured to transmit signals to and receive signals from the CMU(s) 140A, 140B, the panels 161-163 in the first broadcast domain 171, and/or the panel 164 in the second broadcast domain 172, but not the panels 165, 166 in the third broadcast domain 173. The signals transmitted to and received from the panel 168 may be in the first frequency range and the second frequency range, but not in the third frequency range.

In this particular example, the first broadcast domain 171 is used to transmit signals related to the water system (e.g., the wet sensor 151), the second broadcast domain 172 is used to transmit signals related to flushing, volume, and power, and the third broadcast domain 173 is used to transmit signals related to lighting (e.g., the up-wash and down-wash light 152). As a result, the signals related to the water system may not be seen (e.g., received) by the panel 164 in the second broadcast domain 172 and/or the panels 165, 166 in the third broadcast domain 173. As mentioned above, this may have the benefit of reducing interference and increasing traffic efficiency and throughput within the communication system 130. Traffic may, however, be routed between broadcast domains 171-173 when QOS deems this useful.

Communication between frequency ranges and/or broadcast domains 171-175 may be executed by multi-frequency devices such as the CMUs 140A, 140B and/or designated panels 167, 168 that create QOS determinations. Although not shown, in one embodiment, if a panel 161-168 is used to control a device that is assigned to another broadcast domain 171-175, the designated multi frequency panel 167, 168 may rout traffic across broadcast domains 171-175. For example, the panel 164 is shown in the second broadcast domain 172 and is used to transmit signals to control flushing, volume, and power. However, if a user enters a command into the panel 164 to control the water system, the panel 164 may send the signal to the panel 168, and the panel 168 may then rout the signal to the CMUs 140A, 140B to execute the command to control the water system. Alternatively, if the connection is local to one of the panels 161-163 (i.e., controlled directly by one of the panels 161-163 rather than by the CMUs 140A, 140B), the panel 164 may send the signal to the panel 168, and the panel 168 may send the signal to the broadcast domain 171 for the appropriate panel 161-163 to execute the command.

Figure 5:
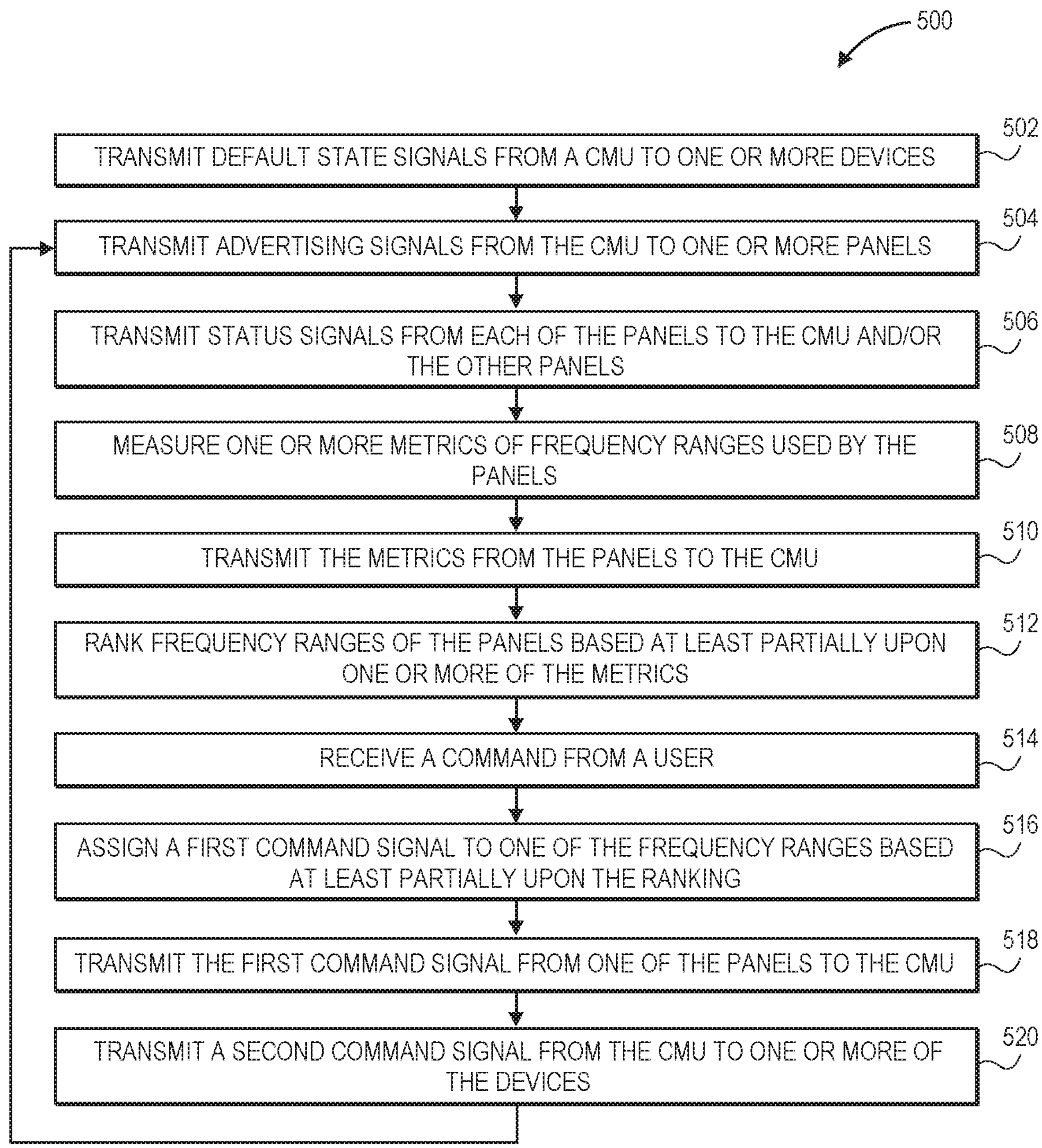
FIG. 5 illustrates a flowchart of a method for communicating within the vehicle, according to an embodiment.

FIG. 5 illustrates a flowchart of a method 500 for communicating within the vehicle 100, according to an embodiment. An illustrative order of the method 500 is described below; however, one or more steps of the method 500 may occur in a different order or be omitted altogether. One or more steps (e.g., 504-520) of the method 500 may be part of a quality-of-service (QOS) determination that is performed by the CMU 140.

The method 500 may begin when the communication system 130 is turned on. The communication system 130 may be turned on automatically when the vehicle 100 is turned on, or the communication system 130 may subsequently be turned on manually by a user. Once the communication system 130 is turned on, the method 500 may include transmitting default state signals from the CMU 140 to one or more of the devices 151-153, as at 502. The default state signals may be transmitted automatically (e.g., in response to the communication system 130 being turned on). The default state signals may be transmitted through the (e.g., existing) wires to the devices 151-153. The default state signals may cause the devices 151-153 to switch into their default states. This may also be referred to as performing default state setup. The default state for each device 151-153 may be pre-programmed into the CMU 140 by an authorized user. In one example, the default state for the wet sensor 151 may be off, the default state for the up-wash and down-wash light 152 may be on, and the default state for the chiller 153 may be off.

The method 500 may also include transmitting advertising signals from the CMU 140 to one or more of the panels 161-166, as at 504. This may represent the start of the QOS determination. The advertising signals may be transmitted automatically (e.g., in response to the communication system 130 being turned on), or the advertising signals may be transmitted in response to the default state signals being transmitted. The advertising signals may be transmitted wirelessly to the panels 161-166. The advertising signals may inform the panels 161-166 of the current states of the devices 151-153 (e.g., the default states). This may also be referred to as advertising the state of the devices. The advertising signals may be transmitted before, simultaneously with, or after the default state signals.

The method 500 may also include transmitting status signals from the panels (e.g., panel 161) to the CMU 140 and/or the other panels (e.g., panels 162-166), as at 506. This may be a continuation of the QOS determination. This step may be performed for each of the panels 161-166. The status signals may be transmitted in response to the panels 161-166 receiving the advertising signals.

The status signals may be transmitted wirelessly to the CMU 140 and/or the other panels 162-166. The status signals may inform the CMU 140 and/or the other panels 162-166 that the first panel 161 is online. The status signals may also or instead inform the CMU 140 and/or the other panels 162-166 that the first panel 161 is in communication with the CMU 140 and/or the other panels 162-166 (e.g., that the first panel 161 received the advertising signals). The status signals may also or instead inform the CMU 140 and/or the other panels 162-166 that the first panel 161 is aware of the current states of the devices 151-153. The status signals may be transmitted before, simultaneously with, or after the default state signals. The status signals may be transmitted before, simultaneously with, or after the advertising signals.

The method 500 may also include measuring one or more metrics of the frequency ranges used by the panels 161-166, as at 508. This may be a continuation of the QOS determination. This step may be performed for each of the panels 161-166. In an example, the metrics of the frequency ranges of the panel 161 may include the metrics of the frequency ranges used to transmit signals from the panel 161 and/or the metrics of the frequency ranges that are used to transmit signals to the panel 161. The metrics of the frequency ranges used by a panel (e.g., panel 161) may be measured in/by that particular panel. As used herein, the metrics may be or include signal strength (e.g., in dBm), bandwidth (e.g., in kb/s), error rate (e.g., measured as a percentage), or a combination thereof.

The frequency ranges may be different (e.g., not overlapping). In one example, a first frequency range may be from about 153 MHz to about 860 MHz, a second frequency range may be from about 861 MHz to about 2411 MHz, and a third frequency range may be from about 2412 MHz to about 5019 MHz. In another example, the first frequency range may be from about 863 MHz to about 870 MHZ, the second frequency range may be from about 902 MHz to about 928 MHZ, and the third frequency range may be from about 2412 MHz to about 2462 MHz, as shown in FIG. 4. As will be appreciated, the frequency may be directly proportional to bandwidth. Thus, higher frequencies have higher bandwidths, and lower frequencies have lower bandwidths.

In one example, the metrics may include the signal strength of the first frequency range (e.g., 902 MHz-928 MHz) used by the first panel 161. In another example, the metrics may include the signal strength and the bandwidth in the first frequency range and the second frequency range (e.g., 2412 MHz-2462 MHz) used by the second panel 162. In another example, the metrics may include the signal strength, the bandwidth, and the error rate in the first frequency range, the second frequency range, and the third frequency range used by each of the panels 161-166.

The method 500 may also include transmitting the metrics from the panels 161-166 to the CMU 140, as at 510. This may be a continuation of the QOS determination. This step may be performed for each of the panels 161-166. The metrics may be transmitted wirelessly.

The method 500 may also include ranking the frequency ranges of the panels 161-166 based at least partially upon one or more of the metrics, as at 512. This may be a continuation of the QOS determination. The ranking may be performed by the CMU 140 for each of the panels 161-166. The ranking may be based at least partially upon one or more of the metrics (e.g., the signal strength, the bandwidth, and/or the error rate), as well as the available devices 151-153 or panels 161-166, the response time of/from the available devices 151-153 or panels 161-166, or a combination hereof.

Ranking the frequency ranges may include determining which of the three frequency ranges is most reliable, which of the three frequency ranges has intermediate reliability, and which of the three frequency ranges is the least reliable. As used herein, "reliability" refers to a likelihood that a signal transmitted in a particular frequency range will be received intact and within a predetermined amount of time. In an example, the first panel 161 may have the first frequency range ranked as the most reliable, the second frequency range ranked as the least reliable, and the third frequency range ranked as having intermediate reliability.

Ranking the frequency ranges may also or instead include determining which of the three frequency ranges has the greatest speed, which of the three frequency ranges has intermediate speed, and which of the three frequency ranges has the least speed. As used herein, "speed" refers to the amount of data that is successfully transferred in a particular frequency range in a predetermined amount of time. In an example, the first frequency range of the first panel 161 may have the least speed, the second frequency range of the first panel 161 may have intermediate speed, and the third frequency range of the first panel 161 may have the greatest speed.

The method 500 may also include receiving a command from a user, as at 514. This may be a continuation of the QOS determination. The command may be received at one of the panels 161-166. In an example, the first device (e.g., the wet sensor) 151 may transmit a measurement (e.g., through existing wires) to the CMU 140 indicating that there is a problem with the water system. The user may then enter a command into the first panel 161 (e.g., to turn the water system off). As described below, the command may be transmitted from the first panel 161 as a first command signal.

The method 500 may also include assigning the first command signal to one of the frequency ranges, as at 516. This may be a continuation of the QOS determination. The first command signal may be transmitted from the first panel 161 to the CMU 140 and/or the other panels 162-166. The assignment may be made by the CMU 140 and stored in the CMU 140, the devices 151-153, and/or the panels 161-166. This step may be performed for each of the panels 161-166.

The assignment may provide the optimal route (e.g., broadcast domain 171-173 and/or frequency range) for transmission of the first command signal. The first command signal may be assigned based at least partially upon the metrics and/or the ranking. More particularly, the first command signal may be assigned based at least partially upon the rankings of the frequency ranges for the panels 161-166 as well as a priority of the first command signal and/or a size of the first command signal. The priority of the first command signal may be determined by an authorized user and stored in the CMU 140 and/or the panels 161-166. In the example discussed above, signals that are related to or control high-priority devices such as the first device (e.g., the wet sensor) 151 may be classified as first (e.g., high) priority signals, signals that are related to or control the intermediate-priority devices such as the second device (e.g., the up-wash and down-wash light) 152 may be classified as second (e.g., intermediate) priority signals, and signals that are related to or control low-priority devices such as the third device (e.g., the chiller) 153 may be classified as third (e.g., low) priority signals.

In one embodiment, the high-priority signals may be assigned to the frequency range with the highest reliability, the intermediate-priority signals may be assigned to the frequency range with the intermediate reliability, and the low-priority signals may be assigned to the frequency range with the lowest reliability. In this particular example, where the first command signal is related to or controls the wet sensor 151, which is a high-priority device, the first command signal may be assigned to the frequency range with the highest reliability. However, as mentioned above, this assignment may also be based at least partially upon the rankings and/or the size of the first command signal, which may, in some embodiments, cause the first command signal to be assigned to a different frequency range.

Command signals having a size that is greater than a first (e.g., upper) size threshold (e.g., 10 MB) may be classified as large signals, command signals having a size that is between than the first (e.g., upper) size threshold (e.g., 1 MB) and a second (e.g., lower) size threshold (e.g., 100 kB) may be classified as intermediate-sized signals, and command signals having a size that is less than the second (e.g., lower) size threshold (e.g., 100 kB) may be classified as small signals. In one embodiment, the large command signals may be assigned to the frequency range with the greatest speed, the intermediate-sized command signals may be assigned to the frequency range with the intermediate speed, and the small command signals may be assigned to the frequency range with the lowest speed.

In at least one embodiment, ranking the frequency ranges by reliability may be based at least partially upon the ranking of the frequency ranges by speed. More particularly, the frequency range with the greatest speed may not be ranked as the most reliable frequency range. As a result, the high-priority command signals may not be assigned to (and thus may not be transmitted in) the frequency range with the greatest speed. This is because the command signals assigned to the frequency range with the greatest speed (e.g., command signals with large sizes or high-volume command signals) may saturate this frequency range, which may deteriorate the reliability of this frequency range.

The method 500 may also include transmitting the first command signal to the CMU 140 (and/or the other panels 162-166), as at 518. This may be a continuation of the QOS determination. The first command signal may include the command from the user. The first command signal may be wireless. The first command signal may be transmitted from the first panel 161 in the frequency range to which it was assigned (in step 516) based at least partially upon the priority of the first command signal, the size of the first command signal, the reliability rankings of the frequency ranges, or a combination thereof.

The method 500 may also include transmitting a second command signal from the CMU 140 to one or more of the devices 151-153, as at 520. This may be a continuation of the QOS determination. The second command signal may include the command from the user. For example, the second command signal may cause the water system to turn "off" (e.g., in response to the measurement from the wet sensor 151 indicating that there is a problem with the water system). In one embodiment, the second command signal may be transmitted through the (e.g., existing) wires. In another embodiment, the second command signal may be wireless and be transmitted in one of the frequency ranges based at least partially upon the priority of the first and/or second command signal, the size of the first and/or second command signal, the reliability rankings of the frequency ranges, or a combination thereof. For example, the second command signal may be transmitted in the same frequency range as the first command signal.

One or more steps of the method 500 may be iterative. For example, the method 500 may loop back to 504, where additional advertising signals may be transmitted from the CMU 140 to the panels 161-166. The additional advertising signals may be transmitted simultaneously with or subsequent to the first command signal being transmitted (as at 518). The additional advertising signals may inform the panels 161-166 that the device 151 is in the "off" state.

Then, at 506, additional status signals transmitted from the panels 161-166 may inform the CMU 140 and/or the other panels 162-166 that the first panel 161 is aware of the updated states of the devices 151-153 (e.g., including the updated state of the water system). Then, at 508, the metrics of the frequency ranges used by the panels 161-166 may be measured again simultaneously with or subsequent to the first command signal being transmitted, the additional advertising signals being transmitted, or both. This time, the metrics may differ from the earlier metrics at least partially due to new traffic such as the first command signals (e.g., to turn the water system off), the additional advertising signals, or both. Then, at 510, the updated metrics may be transmitted from the panels 161-166 to the CMU 140.

Then, at 512, the rankings of the frequency ranges may be updated (e.g., re-ranked) based at least partially upon the metrics measured simultaneously with or subsequent to the first command signal being transmitted, the additional advertising signals being transmitted, or both (i.e., the updated metrics). Another command (e.g., a second command) may then be received from the user at one of the panels (e.g., the first panel 161). The second command may be to actuate the wet sensor 151 back into the first state (e.g., "on").

Another command signal (e.g., a third command signal) may then be assigned to one of the frequency ranges based at least partially upon the re-ranking, the priority level of the third command signal, the size of the third command signal, or a combination thereof. In one example, the third command signal may be assigned to the same frequency range as the first command signal. In another example, the third command signal may be assigned to a different frequency range than the first command signals. The third command signal may then be transmitted to the CMU 140 in the assigned frequency range.

Another command signal (e.g., a fourth command signal) may then be transmitted from the CMU 140 to the wet sensor 151. The fourth command signal may include the second command from the user. The wet sensor 151 may actuate back into the first state (e.g., "on") in response to the fourth command signal. The fourth command signal may be transmitted through the wire.

In this manner, a subsequent command from a user may result in a subsequent command signal being assigned to one of the frequency ranges based upon the updated ranking. In the example above, the subsequent command may control the same device (e.g., water system); however, the command signals to carry out this subsequent command may be assigned to a different frequency range (e.g., than the command to turn the water system off) due to the updated ranking. Thus, as will be appreciated, the communication system 130 may continually update the rankings and assignments to route the command signals through the optimal route.

Figure 6:
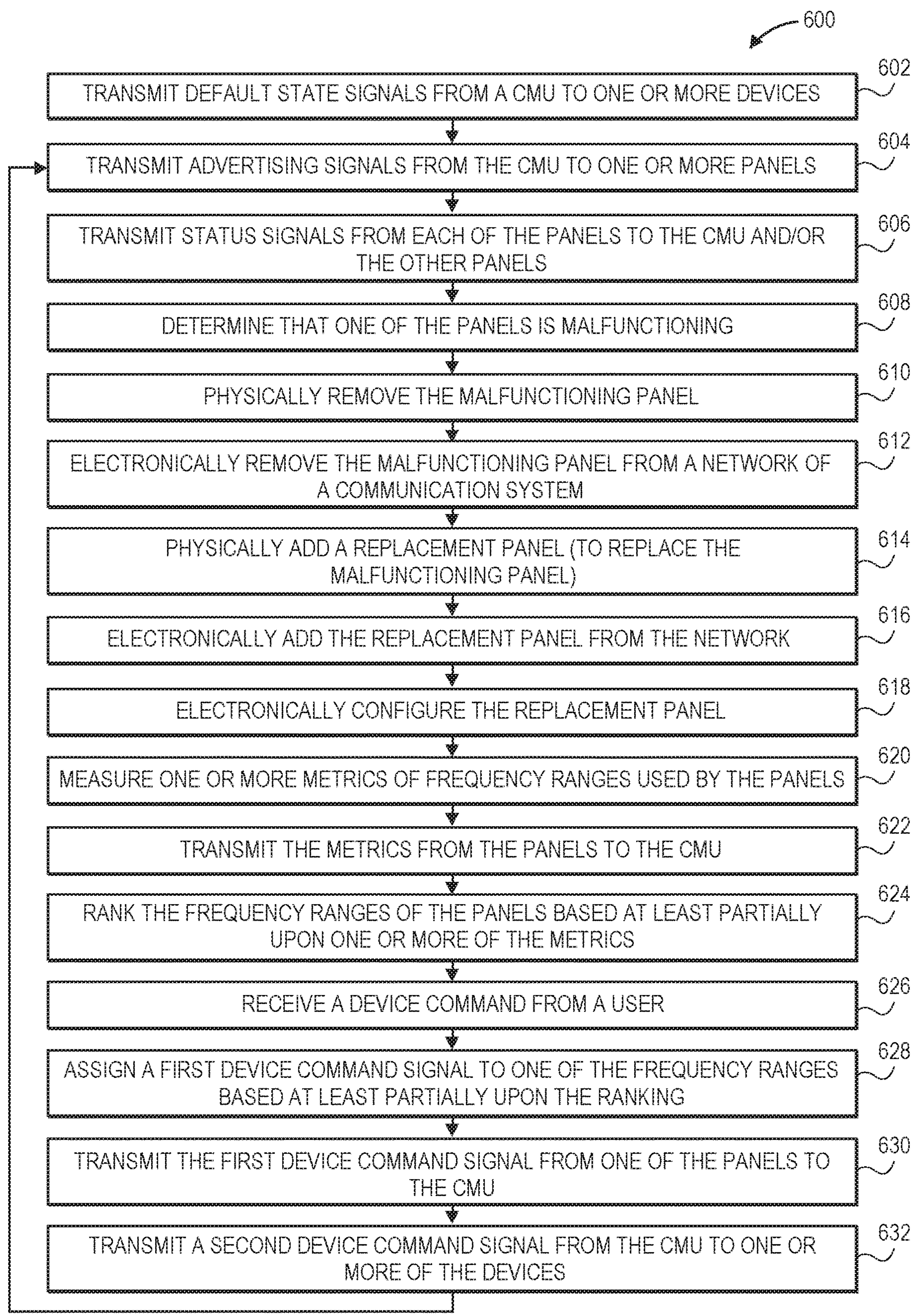
FIG. 6 illustrates a flowchart of another method for communicating within the vehicle, according to an embodiment.

FIG. 6 illustrates a flowchart of another method 600 for communicating within the vehicle 100, according to an embodiment. An illustrative order of the method 600 is described below; however, one or more steps of the method 600 may occur in a different order or be omitted altogether. One or more steps (e.g., 604-608, 612, and 616-632) of the method 600 may be part of a quality-of-service (QOS) determination that is performed by the CMU 140.

The method 600 may begin when the communication system 130 is turned on. The communication system 130 may be turned on automatically when the vehicle 100 is turned on, or the communication system 130 may subsequently be turned on manually by a user. Once the communication system 130 is turned on, the method 600 may include transmitting default state signals from the CMU 140 to one or more of the devices 151-153, as at 602. The default state signals may be transmitted automatically (e.g., in response to the communication system 130 being turned on). The default state signals may be transmitted through the (e.g., existing) wires to the devices 151-153. The default state signals may cause the devices 151-153 to switch into their default states. This may also be referred to as performing default state setup. The default state for each device 151-153 may be pre-programmed into the CMU 140 by an authorized user. In one example, the default state for the wet sensor 151 may be off, the default state for the up-wash and down-wash light 152 may be on, and the default state for the chiller 153 may be off.

The method 600 may also include transmitting advertising signals from the CMU 140 to one or more of the panels 161-166, as at 604. This may represent the start of the QOS determination. The advertising signals may be transmitted automatically (e.g., in response to the communication system 130 being turned on), or the advertising signals may be transmitted in response to the default state signals being transmitted. The advertising signals may be transmitted wirelessly to the panels 161-166. The advertising signals may inform the panels 161-166 of the current states of the devices 151-153 (e.g., the default states). This may also be referred to as advertising the state of the devices. The advertising signals may be transmitted before, simultaneously with, or after the default state signals.

The method 600 may also include transmitting status signals from the panels (e.g., panel 161) to the CMU 140 and/or the other panels (e.g., panels 162-166), as at 606. This may be a continuation of the QOS determination. This step may be performed for each of the panels 161-166. The status signals may be transmitted in response to the panels 161-166 receiving the advertising signals. The status signals may be transmitted wirelessly to the CMU 140 and/or the other panels 162-166. The status signals may inform the CMU 140 and/or the other panels 162-166 that the first panel 161 is online. The status signals may also or instead inform the CMU 140 and/or the other panels 162-166 that the first panel 161 is in communication with the CMU 140 and/or the other panels 162-166 (e.g., that the first panel 161 received the advertising signals). The status signals may also or instead inform the CMU 140 and/or the other panels 162-166 that the first panel 161 is aware of the current states of the devices 151-153. The status signals may be transmitted before, simultaneously with, or after the default state signals. The status signals may be transmitted before, simultaneously with, or after the advertising signals.

The method 600 may also include determining that one of the panels (e.g., the panel 161) is malfunctioning, as at 608. This may be a continuation of the QOS determination. This step may be performed for each of the panels 161-166. In one embodiment, the determination that the panel 161 is malfunctioning may be made at/by the CMU 140 based at least partially upon the data in the status signals from the panel 161. In another embodiment, the determination that the panel 161 is malfunctioning may be made at/by the CMU 140 based at least partially upon a lack of status signals from the panel 161 (i.e., the panel 161 is not transmitting status signals). In another embodiment, the determination that the panel 161 is malfunctioning may be made at/by the panel 161 and/or the user. For example, the user may determine that the panel 161 is not operating properly when the user inputs a command into the panel 161, and the panel 161 does not respond in the normal manner. The malfunctioning may be or include a software failure or a hardware failure due to the end of the component's lifecycle determined by a mean time between failures (e.g., MTBF). The malfunctioning may also or instead be due to an environmental condition such as an electrostatic discharge (ESD).

The method 600 may also include physically removing the panel 161, as at 610. For example, the user may physically disconnect the panel 161 from the vehicle 100 (e.g., from the communication system 130).

The method 600 may also include electronically removing the panel 161 from a network of the communication system 130, as at 612. This may be a continuation of the QOS determination. This may include receiving a removal command from the user at another panel (e.g., not the malfunctioning/removed panel 161). For example, the removal command may be received at the panel 162. More particularly, the user may navigate to a diagnostics graphical interface (GI) page of the panel 162. On the diagnostics GI page, the user may identify the malfunctioning/removed panel 161 and input the removal command to electronically remove the malfunctioning/removed panel 161 from the communication system 130. In response to the removal command, the panel 162 may transmit a removal command signal to the CMU 140 and/or the other panels 163-166 to electronically remove the malfunctioning/removed panel 161 from the communication system 130. The removal command signal may be transmitted wirelessly.

The method 600 may also include physically adding a (e.g., new) replacement panel 169 (see FIG. 1) to replace the malfunctioning/removed panel 161, as at 614. For example, the user may physically connect the replacement panel 169 to the vehicle 100 (e.g., to the communication system 130) in the same location from which the malfunctioning/removed panel 161 was removed. The replacement panel 169 may be substantially similar to the malfunctioning/removed panel 161. For example, the replacement panel 169 may be identical to the malfunctioning/removed panel 161 or an updated version/model of the malfunctioning/removed panel 161.

The replacement panel 169 may be prohibited from communicating within the communication system 130 initially after being installed. For example, the replacement panel 169 may be prohibited from communicating within the communication system 130 by the communication system's security protocol until the replacement panel 169 is recognized and approved by the communication system 130 (e.g., by the CMU 140) by an authorized sequence. However, once the replacement panel 169 is physically added and turned on, the replacement panel 169 may transmit request signals that request the communication system 130 to electronically add the replacement panel 169 to the communication system 130. The request signals may be wireless. The request signals may be received by the CMU 140 and/or the other panels 163-166.

The method 600 may also include electronically adding the replacement panel 169 to the network of the communication system 130, as at 616. This may be a continuation of the QOS determination. Electronically adding the replacement panel 169 to the communication system 130 may include receiving an addition command from the user at another panel (e.g., not the replacement panel 169). For example, the addition command may be received at the panel 162. More particularly, the user may navigate to the diagnostics GI page of the panel 162, which may display a request from the replacement panel 169 to be added to the communication system 130 (e.g., in response to the request signals). The user may then input the addition command to accept the request and add the replacement panel 169 to the communication system 130. In response to the addition command, the panel 162 may transmit an addition command signal to the CMU 140 and/or the other panels 163-166 to electronically add the replacement panel 169 to the communication system 130. The addition command signal may be transmitted wirelessly.

The method 600 may also include electronically configuring the replacement panel 169 within the communication system 130, as at 618. This may be a continuation of the QOS determination. Electronically configuring the replacement panel 169 may include transmitting a configuration signal from the CMU 140 to the replacement panel 169. In one embodiment, the configuration signal may be transmitted automatically upon the replacement panel 169 being (e.g., physically and/or electronically) added. In another embodiment, the configuration signal may be transmitted in response to user input (e.g., to the diagnostics GI page of the panel 162). The configuration signal may inform the replacement panel 169 of its physical location on the aircraft (e.g., in the galley). The configuration signal may also or instead inform the replacement panel 169 of the broadcast domain(s) to which the replacement panel 169 belongs, the frequency ranges that the communication system 130 is using, the priority levels of the devices 151-153, the current states of the devices 151-153, or a combination thereof.

The method 600 may also include measuring one or more metrics of the frequency ranges used by the panels 162-166, 169, as at 620. This may be a continuation of the QOS determination. This step may be performed for each of the panels 162-166, 169. In an example, the metrics of the frequency ranges used by the replacement panel 169 may include the metrics of the frequency ranges used to transmit signals from the replacement panel 169 and/or the metrics of the frequency ranges that are used to transmit signals to the replacement panel 169. The metrics of the frequency ranges used by a panel (e.g., the replacement panel 169) may be measured in/by that particular panel. As used herein, the metrics may be or include signal strength (e.g., in dBm), bandwidth (e.g., in kb/s), error rate (e.g., measured as a percentage), or a combination thereof.

The frequency ranges may be different (e.g., not overlapping). In one example, a first frequency range may be from about 153 MHz to about 860 MHz, a second frequency range may be from about 861 MHz to about 2411 MHz, and a third frequency range may be from about 2412 MHz to about 5019 MHz. In another example, the first frequency range may be from about 863 MHz to about 870 MHZ, the second frequency range may be from about 902 MHz to about 928 MHZ, and the third frequency range may be from about 2412 MHz to about 2462 MHz, as shown in FIG. 4. As will be appreciated, the frequency may be directly proportional to bandwidth. Thus, higher frequencies have higher bandwidths, and lower frequencies have lower bandwidths.

In one example, the metrics may include the signal strength of the first frequency range (e.g., 902 MHz-928 MHz) used by the replacement panel 169. In another example, the metrics may include the signal strength and the bandwidth in the first frequency range and the second frequency range (e.g., 2412 MHz-2462 MHz) used by the panel 162. In another example, the metrics may include the signal strength, the bandwidth, and the error rate in the first frequency range, the second frequency range, and the third frequency range used by each/all of the panels 162-166, 169.

The method 600 may also include transmitting the metrics from the panels 162-166, 169 to the CMU 140, as at 622. The metrics may thus be received by the CMU 140. This may be a continuation of the QOS determination. This step may be performed for each of the panels 162-166, 169. The metrics may be transmitted wirelessly.

The method 600 may also include ranking the frequency ranges of the panels 162-166, 169 based at least partially upon one or more of the metrics, as at 624. This may be a continuation of the QOS determination. The ranking may be performed by the CMU 140 for each of the panels 162-166, 169. The ranking may be based at least partially upon one or more of the metrics (e.g., the signal strength, the bandwidth, and/or the error rate), as well as the available devices 151-153 or panels 162-166, 169, the response time of/from the available devices 151-153 or panels 162-166, 169, or a combination hereof.

Ranking the frequency ranges may include determining which of the three frequency ranges is most reliable, which of the three frequency ranges has intermediate reliability, and which of the three frequency ranges is the least reliable. In an example, the replacement panel 169 may have the first frequency range ranked as the most reliable, the second frequency range ranked as the least reliable, and the third frequency range ranked as having intermediate reliability.

Ranking the frequency ranges may also or instead include determining which of the three frequency ranges has the greatest speed, which of the three frequency ranges has intermediate speed, and which of the three frequency ranges has the least speed. In an example, the first frequency range of the replacement panel 169 may have the least speed, the second frequency range of the replacement panel 169 may have intermediate speed, and the third frequency range of the replacement panel 169 may have the greatest speed.

The method 600 may also include receiving a device command from the user, as at 626. This may be a continuation of the QOS determination. The device command may be received at one of the panels 162-166, 169. In an example, the first device (e.g., the wet sensor) 151 may transmit a measurement (e.g., through existing wires) to the CMU 140 indicating that there is a problem with the water system. The user may then enter the device command into the replacement panel 169 (e.g., to turn the water system off). As described below, the device command may be transmitted from the replacement panel 169 as a first device command signal.

The method 600 may also include assigning the first device command signal to one of the frequency ranges, as at 628. This may be a continuation of the QOS determination. As mentioned below, the first device command signal may be transmitted from the replacement panel 169 to the CMU 140 and/or the other panels 162-166. The assignment may be made by the CMU 140 and stored in the CMU 140, the devices 151-153, and/or the panels 162-166, 169.

The assignment may provide the optimal route (e.g., broadcast domain 171-173 and/or frequency range) for transmission of the first device command signal. The first device command signal may be assigned based at least partially upon the metrics and/or the ranking. More particularly, the first device command signal may be assigned based at least partially upon the rankings of the frequency ranges for the panels 162-166, 169 as well as a priority of the first device command signal, a priority of the device that the first device command signal is controlling, and/or a size of the first device command signal. The priority of the first device command signal and/or the device that the first command signal is controlling may be determined by an authorized user and stored in the CMU 140 and/or the panels 162-166, 169. In the example discussed above, signals that are related to or control high-priority devices such as the first device (e.g., the wet sensor) 151 may be classified as first (e.g., high) priority signals, signals that are related to or control the intermediate-priority devices such as the second device (e.g., the up-wash and down-wash light) 152 may be classified as second (e.g., intermediate) priority signals, and signals that are related to or control low-priority devices such as the third device (e.g., the chiller) 153 may be classified as third (e.g., low) priority signals.

In one embodiment, the high-priority signals may be assigned to the frequency range with the highest reliability, the intermediate-priority signals may be assigned to the frequency range with the intermediate reliability, and the low-priority signals may be assigned to the frequency range with the lowest reliability. In this particular example, where the first device command signal is related to or controls the wet sensor 151, which is a high-priority device, the first device command signal may be assigned to the frequency range with the highest reliability. However, as mentioned above, this assignment may also be based at least partially upon the rankings and/or the size of the first size command signal, which may, in some embodiments, cause the first device command signal to be assigned to a different frequency range.

Device command signals having a size that is greater than a first (e.g., upper) size threshold (e.g., 10 MB) may be classified as large signals, device command signals having a size that is between than the first (e.g., upper) size threshold (e.g., 1 MB) and a second (e.g., lower) size threshold (e.g., 100 kB) may be classified as intermediate-sized signals, and device command signals having a size that is less than the second (e.g., lower) size threshold (e.g., 100 kB) may be classified as small signals. In one embodiment, the large device command signals may be assigned to the frequency range with the greatest speed, the intermediate-sized device command signals may be assigned to the frequency range with the intermediate speed, and the small device command signals may be assigned to the frequency range with the lowest speed.

In at least one embodiment, ranking the frequency ranges by reliability may be based at least partially upon the ranking of the frequency ranges by speed. More particularly, the frequency range with the greatest speed may not be ranked as the most reliable frequency range. As a result, the high-priority command signals may not be assigned to (and thus may not be transmitted in) the frequency range with the greatest speed. This is because the device command signals assigned to the frequency range with the greatest speed (e.g., device command signals with large sizes or high-volume command signals) may saturate this frequency range, which may deteriorate the reliability of this frequency range.

The method 600 may also include transmitting the first device command signal to the CMU 140 (and/or the other panels 162-166), as at 630. In an example, the first device command signal may transmitted from the replacement panel 169 and received by the CMU 140 (and/or the other panels 162-166). This may be a continuation of the QOS determination. The first device command signal may include the device command from the user. The first device command signal may be wireless. The first device command signal may be transmitted from the replacement panel 169 in the frequency range to which it was assigned (in step 628) based at least partially upon the priority of the first device command signal, the priority of the device that the first device command signal controls, the size of the first device command signal, the reliability rankings of the frequency ranges, or a combination thereof.

The method 600 may also include transmitting a second device command signal from the CMU 140 to one or more of the devices 151-153, as at 632. This may be a continuation of the QOS determination. The second device command signal implement the device command from the user to turn the water system "off". In one embodiment, the second device command signal may be transmitted through the (e.g., existing) wires. In another embodiment, the second device command signal may be wireless and be transmitted in one of the frequency ranges based at least partially upon the priority of the first and/or second device command signal, the priority of the device that the first and/or second device command signal(s) control, the size of the first and/or second device command signal, the reliability rankings of the frequency ranges, or a combination thereof. For example, the second device command signal may be transmitted in the same frequency range as the first device command signal.

One or more steps of the method 600 may be iterative. For example, the method 600 may loop back to 604, where additional advertising signals may be transmitted from the CMU 140 to the panels 162-166, 169. The additional advertising signals may be transmitted simultaneously with or subsequent to the first device command signal being transmitted/received (as at 630). The additional advertising signals may inform the panels 162-166, 169 that the device 151 is now in the "off" state.

Then, at 606, additional status signals transmitted from the panels 162-166, 169. For example, additional status signals may be transmitted from the replacement panel 169 to inform the CMU 140 and/or the other panels 162-166 that the replacement panel 169 is aware of the updated states of the devices 151-153 (e.g., including the updated state of the water system). Then, at 620, the metrics of the frequency ranges used by the panels 162-166, 169 may be measured again simultaneously with or subsequent to the first device command signal being transmitted/received, the additional advertising signals being transmitted, or both. This time, the metrics may differ from the earlier metrics at least partially due to new traffic such as the first device command signals, the additional advertising signals, or both. Then, at 622, the updated metrics may be transmitted from the panels 162-166, 169 and received by the CMU 140.

Then, at 624, the rankings of the frequency ranges may be updated (e.g., the frequency ranges may be re-ranked) based at least partially upon the updated metrics. Then, at 626, another device command (e.g., a second device command) may then be received from the user at one of the panels (e.g., the replacement panel 169). In an example, the second device command may be to actuate the wet sensor 151 back into the first state (e.g., "on").

Another device command signal (e.g., a third device command signal) may then be assigned to one of the frequency ranges based at least partially upon the re-ranking of the frequency ranges, the priority level of the third device command signal, the priority of the device that the third device signal controls, the size of the third device command signal, or a combination thereof. In one example, the third device command signal may be assigned to the same frequency range as the first device command signal. In another example, the third device command signal may be assigned to a different frequency range than the first device command signal.

Then, at 628, the third device command signal may be transmitted from the replacement panel 169 to the CMU 140 in the assigned frequency range. Then, at 632, another device command signal (e.g., a fourth device command signal) may be transmitted from the CMU 140 to the wet sensor 151 to implement the second device command from the user. The wet sensor 151 may actuate back into the first state (e.g., "on") in response to the fourth device command signal. The fourth device command signal may be transmitted through the wire.

In this manner, a subsequent device command from a user may result in a subsequent device command signal being assigned to one of the frequency ranges based upon the updated metrics and/or the updated rankings. In the example above, the subsequent device command may control the same device (e.g., water system); however, the device command signals to carry out this subsequent device command may be assigned to a different frequency range (e.g., than the command to turn the water system off) due to the updated rankings. Thus, as will be appreciated, the communication system 130 may continually update the rankings and assignments to route the device command signals through the optimal route.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A system for communicating within a vehicle, comprising:

a cabin manager unit (CMU) in the vehicle, wherein the CMU is configured to communicate with a device in the vehicle and configured to communicate wirelessly with a first panel in the vehicle via a network of a communication system in the vehicle, and wherein the CMU is configured to perform operations, the operations comprising:

electronically removing the first panel from the network in response to the first panel malfunctioning;

electronically adding a second panel to the network to replace the first panel, wherein electronically adding the second panel comprises receiving an addition command signal from a third panel in the network, and wherein the CMU is configured to communicate wirelessly with the second panel and the third panel;

ranking a plurality of frequency ranges used by the second panel based at least partially upon one or more metrics of the frequency ranges;

receiving a first command signal from the second panel in one of the frequency ranges, wherein the one of the frequency ranges is selected based at least partially upon the ranking, and wherein the first command signal comprises a command from a user that is received at the second panel; and transmitting a second command signal to the device, wherein the second command signal comprises the command from the user, and wherein the device actuates from a first state to a second state in response to the second command signal.

2. The system of claim 1, wherein the operations further comprise:

receiving status signals from the first panel; and determining that the first panel is malfunctioning based at least partially upon the status signals.

3. The system of claim 1, wherein the operations further comprise determining that the first panel is malfunctioning based at least partially upon a lack of status signals or no status signals received from the first panel.

4. The system of claim 1, wherein the operations further comprise electronically configuring the second panel by transmitting a configuration signal to the second panel, wherein the configuration signal informs the second panel of its configuration in relation to a location in the vehicle where the second panel is installed, a priority level of the device, and a current state of the device.

5. The system of claim 1, wherein the operations further comprise:

transmitting a default state signal to the device, wherein the default state signal causes the device to switch into a default state; and transmitting an advertising signal to the first panel, the second panel, or both, wherein the advertising signal informs the first panel, the second panel, or both that the device is in the default state.

6. The system of claim 1, wherein the one or more metrics comprise signal strength, bandwidth, error rate, data that promotes efficiency and reliability of the network, or a combination thereof.

7. The system of claim 1, wherein the frequency ranges are ranked by reliability, speed, or a combination thereof.

8. The system of claim 1, wherein the operations further comprise assigning the first command signal to the one of the frequency ranges based at least partially upon a priority level of the device and a size of the first command signal.

9. The system of claim 1, wherein the frequency ranges comprise a first frequency range that is between about 153 megahertz (MHz) and about 860 MHz, a second frequency range that is between about 861 MHz and about 2411 MHz, and a third frequency range that is between about 2412 MHz and about 5019 MHz.

10. A system for communicating within an airplane, comprising:

a first panel;

a second panel;

a third panel; and a cabin manager unit (CMU) in the airplane that is configured to communicate wirelessly with the first panel, the second panel, the third panel, or a combination thereof in the airplane via a network of a communication system, and configured to communicate with a plurality of devices in the airplane through one or more wires, wherein the CMU is configured to perform operations, the operations comprising:

transmitting default state signals to the devices;

transmitting advertising signals to the first panel, the third panel, or both;

electronically removing the first panel from the network in response to the first panel malfunctioning;

electronically adding the second panel to the network to replace the first panel, wherein electronically adding the second panel comprises receiving an addition command signal from the third panel;

electronically configuring the second panel by transmitting a configuration signal to the second panel, wherein the configuration signal informs the second panel of a priority level of a first device of the plurality of devices and a current state of the first device;

receiving a plurality of metrics from the second panel, wherein the metrics are measured by the second panel, wherein the metrics are related to a plurality of frequency ranges used by the second panel, and wherein the metrics comprise signal strength, bandwidth, and error rate;

ranking the frequency ranges based at least partially upon the metrics, wherein the frequency ranges are ranked by reliability, speed, or a combination thereof;

assigning a first command signal to a first frequency range of the plurality of frequency ranges based at least partially upon the ranking, the priority level of the first device, and a size of the first command signal, wherein the first command signal comprises a command received from a user at the second panel, and wherein the command is to actuate the first device from the default state to a second state;

receiving the first command signal from the second panel in the first frequency range, wherein the first command signal is wireless; and transmitting a second command signal to the first device, wherein the second command signal comprises the command from the user, wherein the first device actuates from the default state to the second state in response to the second command signal, and wherein the second command signal is transmitted through one of the one or more wires.

11. The system of claim 10, wherein the operations are iterative and further comprise:

transmitting additional advertising signals to the second panel, the third panel, or both simultaneously with or subsequent to the first command signal being received, wherein the additional advertising signals inform the second panel, the third panel, or both that the first device is in the second state.

12. The system of claim 11, wherein the metrics are measured simultaneously with or subsequent to the first command signal being received, the additional advertising signals being transmitted, or both, and wherein the operations further comprise re-ranking the frequency ranges based at least partially upon the metrics measured simultaneously with or subsequent to the first command signal being received, the additional advertising signals being transmitted, or both.

13. The system of claim 12, wherein the operations further comprise:

assigning a third command signal to a second frequency range of the plurality of frequency ranges based at least partially upon the re-ranking, the priority level of the first device, and the size of the third command signal, wherein the third command signal comprises a second command received from the user at the second panel, wherein the second command is to actuate the first device from the second state back into to the default state, and wherein the second frequency range is different than the first frequency range;

receiving the third command signal from the second panel in the second frequency range, wherein the third command signal is wireless; and transmitting a fourth command signal to the first device, wherein the fourth command signal comprises the second command from the user, wherein the first device actuates from the second state back into the default state in response to the fourth command signal, and wherein the fourth command signal is transmitted through the one of the one or more wires.

14. The system of claim 13, wherein a first broadcast domain is used to transmit the first command signal from the second panel to the CMU in the first frequency range, a second broadcast domain is used to transmit the third command signal in the second frequency range, and a third broadcast domain is used to transmit signals in a third frequency range.

15. A method for communicating within a vehicle, comprising:

electronically removing a first panel from a network of a communication system in the vehicle in response to the first panel malfunctioning;

electronically adding a second panel to the network to replace the first panel;

electronically configuring the second panel by transmitting a configuration signal to the second panel, wherein the configuration signal informs the second panel of a plurality of frequency ranges used by the second panel, a priority level of a device in the vehicle, and a current state of the device;

ranking the frequency ranges used by the second panel based at least partially upon one or more metrics of the frequency ranges;

receiving a first command signal from the second panel in a first of the frequency ranges, wherein the first frequency range is selected based at least partially upon the ranking, and wherein the first command signal comprises a command from a user that is received at the second panel; and transmitting a second command signal to the device, wherein the second command signal comprises the command from the user, and wherein the device actuates from a first state to a second state in response to the second command signal.

16. The method of claim 15, further comprising:

receiving status signals from the first panel; and determining that the first panel is malfunctioning based at least partially upon the status signals.

17. The method of claim 15, further comprising determining that the first panel is malfunctioning based at least partially upon a lack of status signals received from the first panel.

18. The method of claim 15, wherein electronically adding the second panel comprises receiving an addition command signal from a third panel in the network, wherein the addition command signal is wireless.

* * * * *